Oct. 5, 1954  P. A. RAICHE  2,690,595
MANUFACTURE OF LOW-PRESSURE INFLATION CATHETERS
Filed June 22, 1951  2 Sheets-Sheet 2
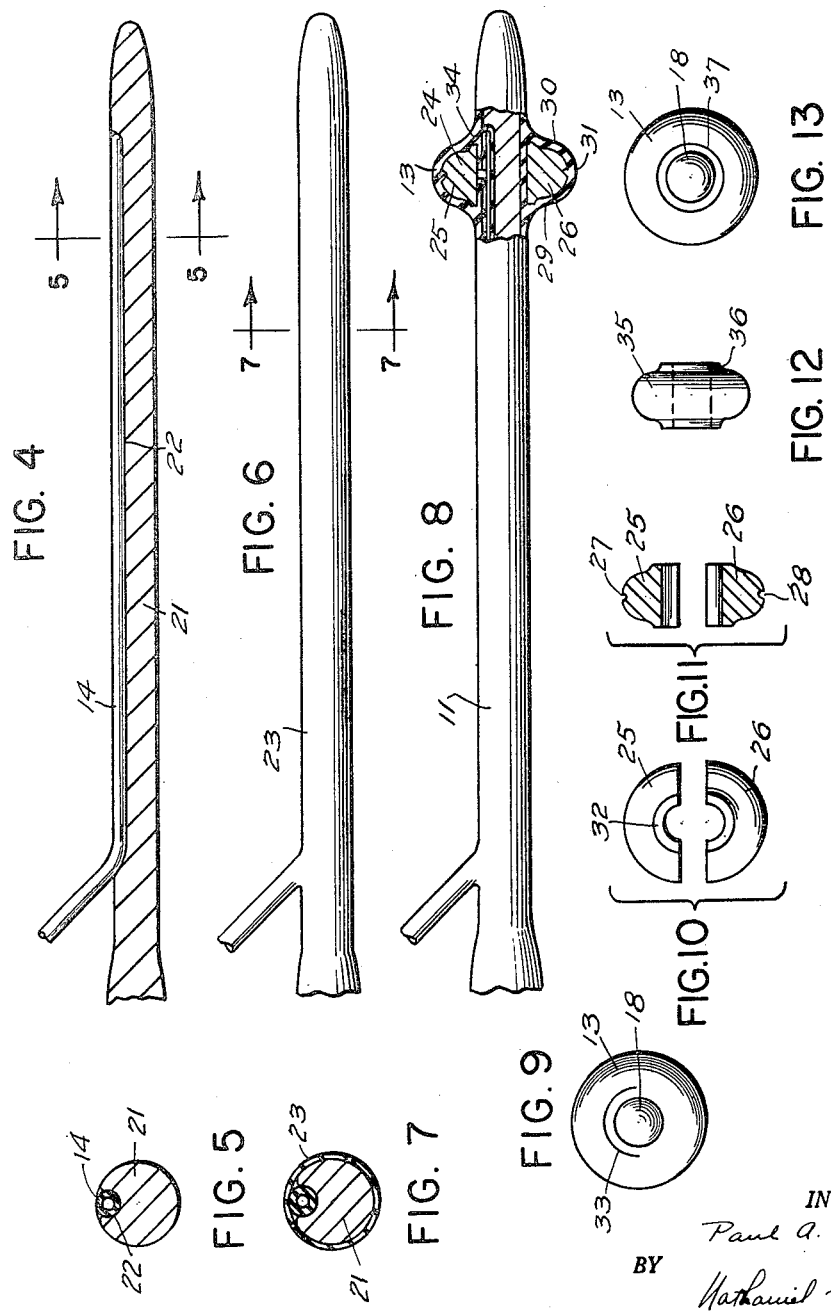

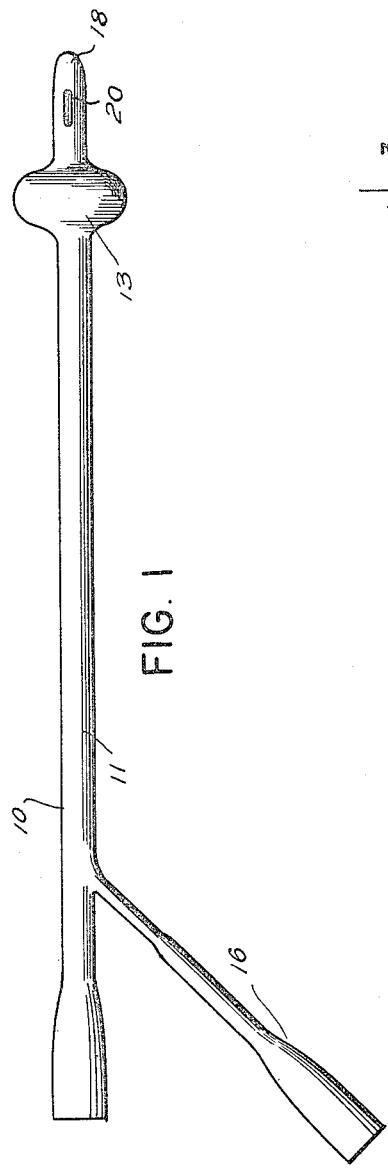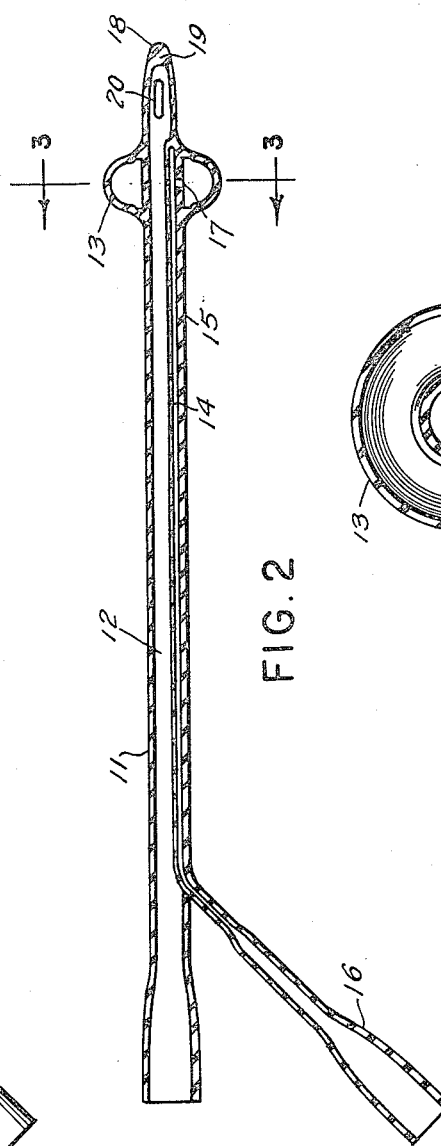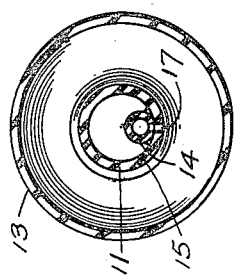

Patented Oct. 5, 1954

2,690,595

UNITED STATES PATENT OFFICE 2,690,595

MANUFACTURE OF LOW-PRESSURE INFLATION CATHETERS

Paul A. Raiche, North Providence, R. I., assignor to Davol Rubber Company, a corporation of Rhode Island Application June 22, 1951, Serial No. 233,011

2 Claims. (Cl. 18—58.7)

The present invention relates to the manufacture of hollow rubber articles, and has particular reference to the manufacture of catheters and tubes of the balloon type.

The principal object of the invention is to provide a catheter or tube having a low pressure inflation balloon.

Another object of the invention is to provide a catheter or tube of the balloon type which requires no dilating fluid under pressure.

A further object of the invention is to provide a catheter or tube of the balloon type which cannot collapse when in use.

An additional object of the invention is to provide a light weight indwelling self-retaining catheter or tube of the balloon type which cannot injure a patient by rupturing from internal pressure.

With the above and other objects and advantageous features in view, the invention consists of a novel method of manufacture more fully disclosed in the detailed description following, in conjunction with the accompanying drawings, and more specifically defined in the claims appended thereto.

In the drawings,

Fig. 1 is a plan view of a catheter construction embodying the invention;

Fig. 2 is a longitudinal vertical section of Fig. 1;

Fig. 3 is a section on the line 3—3 of Fig. 2;

Fig. 4 is a plan view of a catheter grooved form with a preformed inflation tube, ready for dipping;

Fig. 5 is a section on the line 5—5 of Fig. 4;

Fig. 6 is a plan view of the form after the first dip;

Fig. 7 is a section on the line 7—7 of Fig. 6;

Fig. 8 is a view of Fig. 6 after the annular member is mounted thereon, and dipped;

Fig. 9 is an end view of Fig. 8, showing the arcuate cut at the fillet bead for removal of the half-sections of the annular member;

Fig. 10 is a plan view of the annular sectional member;

Fig. 11 is a section on the line 11—11 of Fig. 10;

Fig. 12 is a plan view of a solid annular member; and

Fig. 13 is a view similar to Fig. 9, showing an annular cut at the fillet bead.

It has been found desirable to provide a balloon type catheter or tube of the balloon type which has a preshaped balloon, and therefore requires very little or no expansion to be retained in place when inserted in a body orifice. To this end, I preform the balloon during the catheter or tube manufacture to the desired size, whereby the low pressure balloon assumes the size and shape of an inflated balloon of the same capacity.

The preforming of the balloon has substantial advantage in surgical use, in that very little or no fluid under pressure is required. When an inflatable balloon of the type disclosed in Patent No. 2,248,934 is inflated with air to retention size, a rupture of the balloon when in use produces a sudden expansion, wherefore it is customary to use sterile water as the expansion medium.

Another difficulty found in the use of inflatable balloons resides in the inability to accurately measure the capacity of the inflated balloon when using air as the expansion fluid; when using water as the expansion fluid, the weight of the water may be undesirable.

Further, it is difficult to ensure uniform expansion of the balloon, even when preformed balloons are utilized as disclosed in U. S. Patent No. 2,308,484, as the balloon must be of very thin stock. Another difficulty with inflatable balloons resides in the possibility of collapse if the balloon leaks, or the inlet tube opens, whereupon the catheter or tube is no longer effective.

I have therefore provided a catheter construction which has an integral preshaped balloon, wherefore the balloon is retained in a body orifice until removed by a stylette as hereinafter explained.

Referring to the drawings, which disclose a catheter construction embodying the invention, the catheter 10 has an elongated tubular body portion 11 having a central drainage or incubation passage 12, a balloon 13, and an inflation tube 14 which is embedded in the wall 15 of the body portion and has a funnel shaped outer end 16 and an opening 17 at its inner end within the balloon 13. The body portion has a tip 18 at its distal end, which may be reinforced as indicated at 19, and drainage eyes 20 in the wall of the body portion between the balloon and the tip, the eyes 20 being preferably two in number and in diametrically opposed relation and communicating with the drainage passage 12.

A catheter form 21, see Fig. 4, is provided with a longitudinal groove 22 for receiving a preformed inflation tube 14, and is dipped in latex or other natural or synthetic rubber solution to provide an initial coating 23 which is somewhat less than the desired final diameter, the coating being pierced through the inflation tube inner end to free an opening 17, in usual manner. The coating is semi-dried, preferably in air, and an annular member 24 comprising two half sections 25, 26 is then mounted on the coating in spaced relation to the tip, the half sections having grooves 27, 28 to receive a cotton thread or the like for holding the sections in place. The dipping in then continued to the desired diameter, whereby the balloon 13 is formed with its sides 29, 30 integrally joined to the body portion and its outer wall 31 spaced from the body portion. The catheter is now semi-dried.

As noted in Fig. 10, the half sections are provided with inner fillets 32, and an arcuate cut 33 is made in one fillet of the balloon, see Fig. 9, whereby the half sections may be withdrawn. The fillet shape provides an annular fillet bead 34 at the juncture of the balloon and the body portion, see Fig. 8, which exerts tension to bring the edges of the cut 33 together after removal of the half sections, whereby latex cement is applied to close the cut. The drainage eyes are then cut, the catheter form is removed, and the completed catheter is then leached and finish cured.

If desired, an annular member 35, see Fig. 12, with fillets 36, may be used instead of two half sections, the member 35 being slipped on the coating 23 to the proper position. After the catheter has been dipped to final diameter, an annular cut 37, see Fig. 13, is made in one fillet head, and the member 35 may then be removed and the cut cemented with latex cement, the steps being otherwise as described above. A number of balloons in desired spaced relation may be provided, using several annular members.

When the novel catheter is to be used, a metal stylette is inserted to stretch the ballooon, whereupon insertion is facilitated. The balloon assumes its preformed shape at atmospheric pressure within the orifice without need for expansion by air or water, and is of exact predetermined size. Under special conditions, it may be desirable to dilate the balloon, either slightly or substantially. Since there is no expansion fluid in usual use, it cannot rupture, and it stays in place until retracted with a stylette. It can therefore be used in the same manner as an expansible balloon catheter or tube, or if desired, in place of a Pezzar or wing type catheter or tube. When used in place of a Pezzar or wing type catheter or tube, it has the advantage that the drainage eyes are in the catheter tip, whereby the incidence of trauma such as may occur with use of a Pezzar or wing type catheter or tube is substantially reduced.

Although I have disclosed a specific catheter and its manufacture, it is obvious that the manufacturing steps may be varied for different catheter constructions and uses, without departing from the spirit and the scope of the invention as defined in the appended claims.

I claim:

1. In the manufacture of balloon catheters, the steps of placing an inflation tube in the groove of a longitudinally grooved catheter form, dipping the form and the inflation tube in latex or the like to provide an elongated catheter body having a wall inflation passage, opening the distal end of the inflation passage through the wall, positioning an annular member of balloon shape over the inflation passage opening, dipping the elongated catheter body and the annular member to form a balloon around the annular member with spaced sides integrally joined to the catheter body and an outer wall spaced from the catheter body, cutting the balloon at one side at the juncture of the balloon and the catheter body, withdrawing the annular member through the cut, cementing the cut, cutting a drainage eye through the catheter body between the balloon and the distal end, removing the catheter form, and finish curing the catheter.

2. In the manufacture of balloon catheters, the steps of forming an elongated catheter body with a central bore, an inflation passage in the body wall, and an opening through the wall to the inflation passage, positioning an annular member of balloon shape over the inflation passage opening, dipping the elongated catheter body and the annular member to form a balloon around the annular member with spaced sides integrally joined to the catheter body and an outer wall spaced from the catheter body, cutting the balloon at one side at the juncture of the balloon and the catheter body, withdrawing the annular member through the cut, cementing the cut, cutting a drainage eye through the catheter body between the balloon and the distal end, removing the catheter form, and finish curing the catheter.

References Cited in the file of this patent

UNITED STATES PATENTS

| Number | Name | Date |
|---|---|---|
| 2,203,072 | Albright | June 4, 1940 |
| 2,259,488 | Raiche | Oct. 21, 1941 |
| 2,272,289 | Beal | Feb. 10, 1942 |
| 2,296,105 | Hansen | Sept. 15, 1942 |
| 2,322,858 | Limbert | June 29, 1943 |
| 2,478,249 | Culik | Aug. 9, 1949 |
| 2,481,488 | Auzin | Sept. 13, 1949 |